N. W. SAUNDERS.
GEAR SHIFTING APPARATUS.
APPLICATION FILED MAR. 24, 1917.

1,238,701.

Patented Aug. 28, 1917.
3 SHEETS—SHEET 1.

Fig. I.

INVENTOR
Norman W. Saunders
BY
Raymond A. Parker
ATTORNEY

UNITED STATES PATENT OFFICE.

NORMAN W. SAUNDERS, OF DETROIT, MICHIGAN, ASSIGNOR TO THE S. M. C. CO., INC., OF DETROIT, MICHIGAN, A CORPORATION OF MICHIGAN.

GEAR-SHIFTING APPARATUS.

1,238,701.

Specification of Letters Patent. Patented Aug. 28, 1917.

Application filed March 24, 1917. Serial No. 157,069.

*To all whom it may concern:*

Be it known that I, NORMAN W. SAUNDERS, a citizen of the United States, residing at Detroit, county of Wayne, State of Michigan, have invented a certain new and useful Improvement in Gear-Shifting Apparatus, and declare the following to be a full, clear, and exact description of the same, such as will enable others skilled in the art to which it pertains to make and use the same, reference being had to the accompanying drawings, which form a part of this specification.

This invention relates to gear shifting mechanism of the type where pre-selection of the next desired gear ratio is made and the gears at a suitable time are carried in the mesh without any movement intended solely for that purpose; that is to say, in the example we describe below, pre-selection of the gear ratio desired is made by the aid of electrical transmission and power devices, and the gears are carried into the next relation by the same operation that moves the clutch.

In the drawings,—

Figure 2:
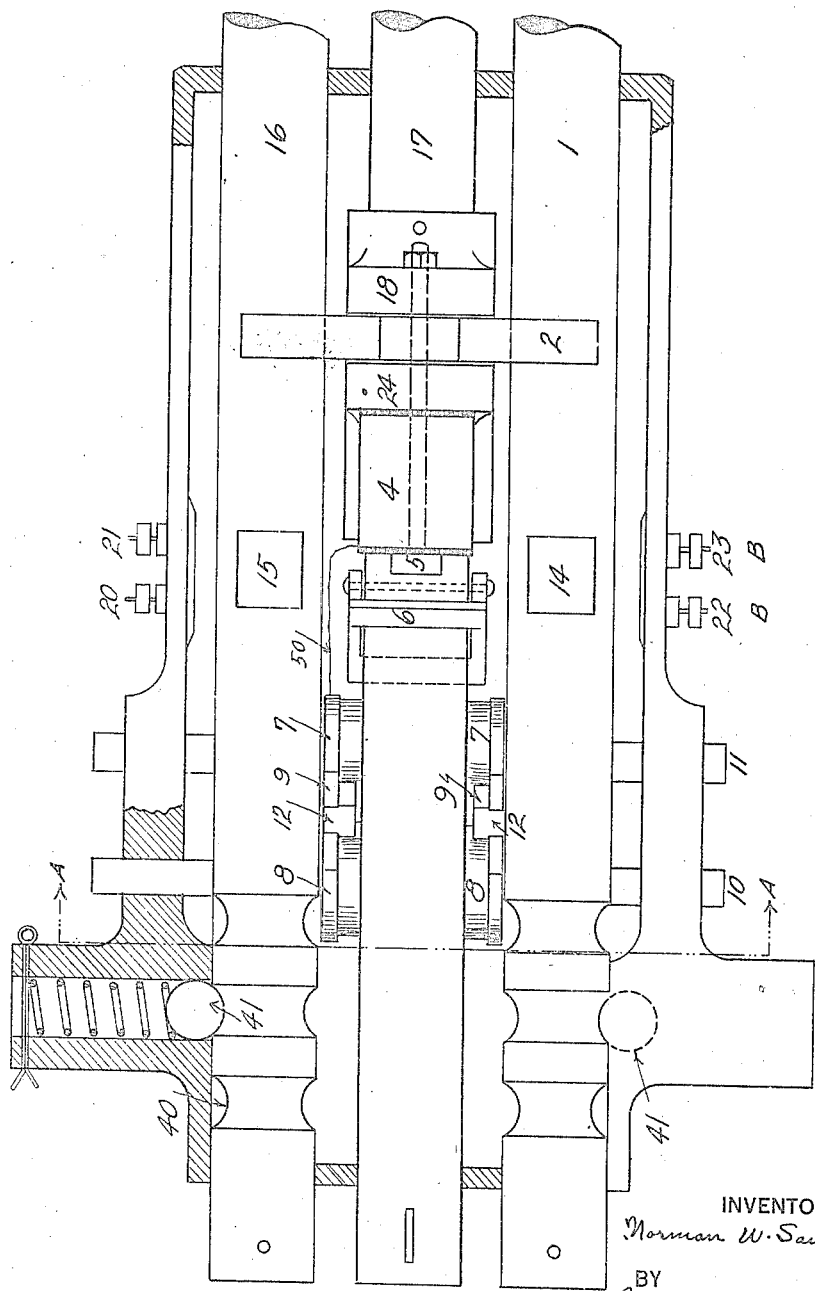
Fig. 2, is a top plan view of the apparatus with the two magnets 3 and 28 of Fig. 3 being removed.
Figure 3:
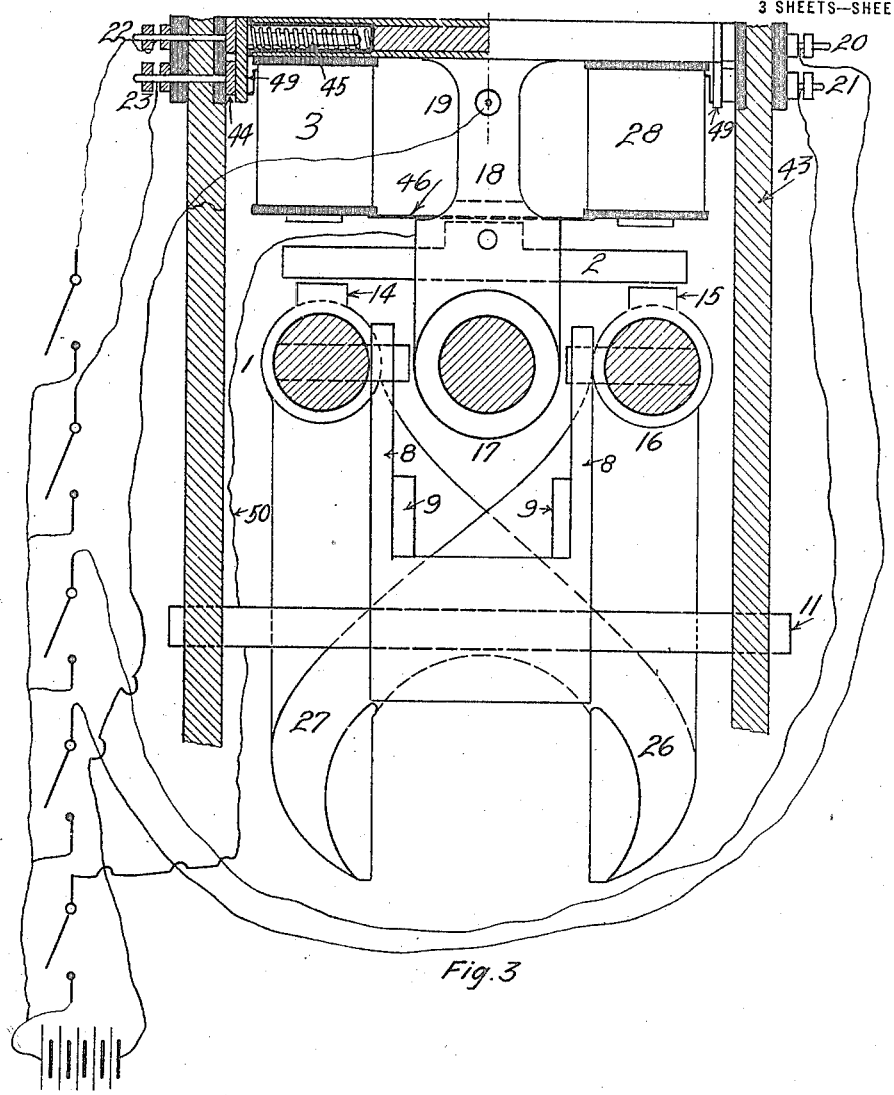

Fig. 3, is a vertical cross-section of the apparatus taken on the line A, A, except for that part appearing in the upper left-hand corner and which is taken on the line B, B of Fig. 2. The wiring and switches are shown diagrammatically. This view shows the gear-shifting forks, which are omitted in the other views.

The gear-shifting rods 1 and 16 are the usual gear-shifting rods used in the ordinary transmission for automobiles. These rods are each provided with a gear-shifting fork, 26 and 27 respectively, (shown only in Fig. 3). Each of the shifting rods is provided with three annular grooves 40 into which is spring-projected the ball 41 for the purpose of affording somewhat of a lock for the gears in any one of the three positions each rod may take. On the top of each gear-shifting rod is a lug, one being designated 14 and the other 15. Between the gear-shifting rods 1 and 16 is located a reciprocatable shaft 17, which is connected to always move with the clutch lever (not shown). This shaft 17 is provided with a bracket 18—24 between the uprights of which is pivoted the double armature 2.

The bracket 18 is a casting which flares out at the top in the form of the bar of a T so that the ends of the bar of the T are very close to the sides of the casing 43. The bar portion of this T is bored, as shown in Fig. 3, to receive the contact pin 49, which is projected outwardly by the spring 45. Now, referring to Fig. 2, it will be seen that each side of the casing 43 is provided with two binding posts which are designated 20, 21, 22 and 23. By comparing Figs. 1 and 3 it will be seen that these binding posts connect with contact strips or electrodes designated in accordance with the binding posts which they are associated with. Each of the binding posts is connected by a wire with a switch (Fig. 3). The current passes from the battery through the binding post and companion strips, contact members 49, wires 44, to the magnets 3 and 28. It will be noted from looking at Fig. 1 that the contact strips or the electrodes 20 and 21 are arranged one below and in advance of the other. The purpose of this is that when the clutch is shifted from the position shown in Fig. 2, the magnet 28 will be energized, depending upon which switch governing the electrodes 20, 21 is closed. The energizing of the magnet 28 occurs after the armature 2 has passed the lug 14, when the switch connected with the electrode 20 is closed and just before the armature 2 passes the lug 14 in connection with the closing of the switch used in conjunction with the electrode 21. Obviously then the result will be that in throwing out the clutch the gear connected with the rod 1 will be shifted in one direction, if the magnet 28 has been energized before the armature 2 reaches the lug 14, allowing the clutch to go in, will shift the gear in the opposite direction, if the armature has been moved after the magnet 28 passed the lug *x* on the forward stroke. The same holds true on the other side, so this need not be described in connection with the magnet 3. A spring 46 of the flat band variety, serves to hold the armature 2 normally in its inactive position.

Figure 1:
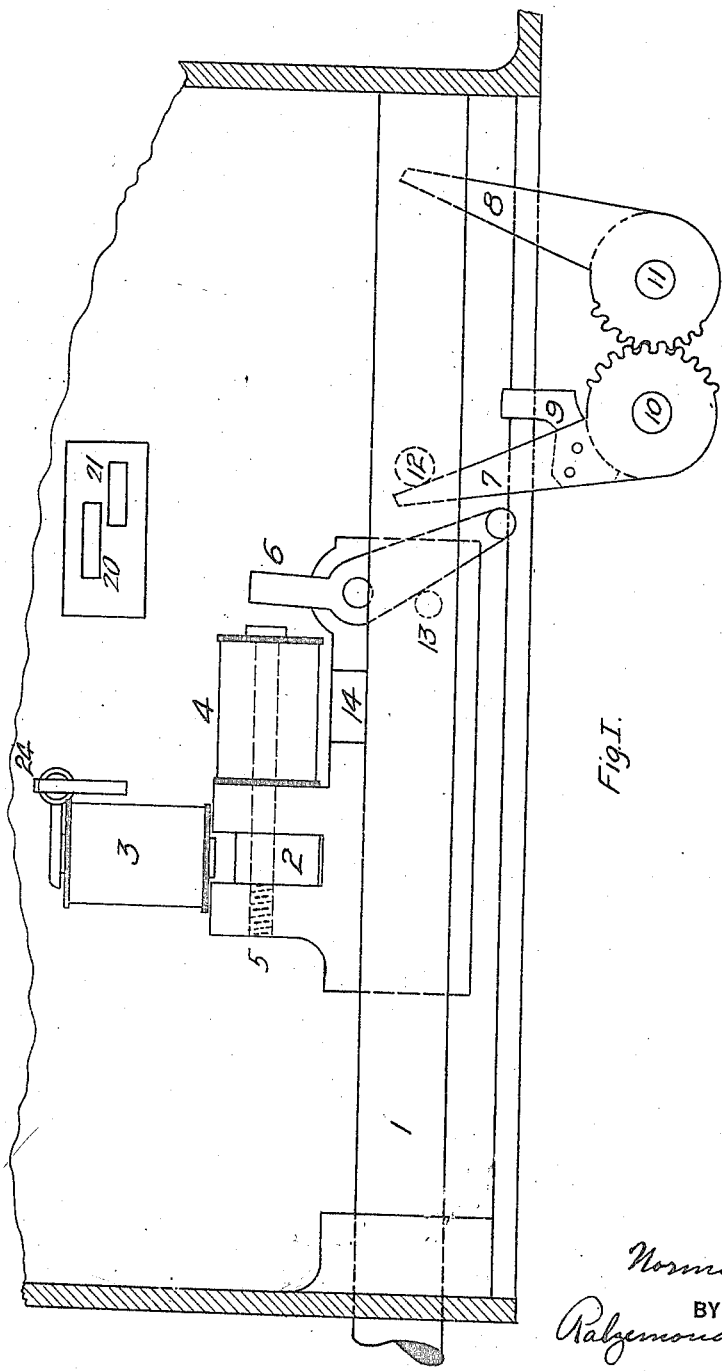
Figure 1, is a vertical longitudinal section of the case showing the apparatus in elevation.

The gears are driven back to neutral in the following manner: Referring to Fig. 1, it will be seen that two arms 7 and 8 are provided, which have hubs which turn on the shafts 10 and 11 that are in turn provided with intermeshing gear teeth so that the two arms 7 and 8 are compelled to move to the. The arms 7 have riveted to them the lugs 9, which as shown in Fig. 1, are in the path of the tail of the armature 6 (Figs. 1 and 2). Consequently when the shaft 17 connected with the clutch lever is reciprocated to the right by throwing the clutch out, it would ordinarily cause the tail of the armature 6 to engage the lug 9 and turn the arms 7 and 8. The pin 13 prevents the tail of the armature 6 from rotating when it strikes the lug 9. Referring to Fig. 2, it will be noted that there are two sets of these arms 7 and 8 and two lugs 9, and that the tail of the armature 6 engages both of these lugs 9. No matter which one of the four gear ratios are in active combination, the four arms 7, 7, 8, 8 will engage one of the pins 12 in the sides of the shiftig rods 1 and 16. The pin 12 might possibly be in engagement with the arm 7, as shown in Fig. 1, or it might be in engagement with the arm 8, depending upon whether the shifting rod was shifted clear forward or clear to the rear. Hence, under the above operations, the clutch every time in going out will carry the gears to neutral before the armature 2 picks up either one of the lugs 14 or 15. By the time the lug is picked up, the tail of the armature 6 is dropped off from the ends of the lugs 9.

It is undesirable, however, to shift the gears back to neutral every time the clutch is used. Consequently provision is made so that by simply keeping closed one of the switches, the magnet 4 is energized (circuit designated 50), attracting the armature 6 and keeping the tail of the armature in such position that it will not strike the lug 9 but will pass thereover inactively.

What we claim is:

1. In gear-shifting apparatus, the combination of gear-shifting devices operated by the clutch, electrical devices for preselecting the gear to be shifted and the direction of shifting, means for returning the gears to neutral by shifting the clutch, and means for rendering inoperative the last-mentioned neutralizing means.

2. In gear-shifting apparatus, the combination of gear-shifting devices, comprising a pair of shifting rods each provided with a lug, electro-magnetic means having one or more circuits, an armature in connection therewith, means for controlling the circuit or circuits, through the magnetic means for bringing the armature in the path of either one of the lugs before or after passing over it on the forward stroke, and means for reciprocating the electro-magnetic means.

3. In gear-shifting apparatus, the combination of gear-shifting rods each provided with a projecting lug, a shaft reciprocatable with the clutch and provided with a pair of electric magnets one above each gear-shifting rod, an armature which can be attracted by either magnet and brought into the path of either lug, and electrical contact devices and switches for operating either magnet to bring the armature means into the path of either lug before or after passing over the same on the throwing out of the clutch.

4. In gear-shifting apparatus, the combination of means for carrying the gears back to neutral with every movement of the clutch, and means for optionally rendering inoperative the first-mentioned means.

5. In gear-shifting apparatus, the combination of a reciprocating shaft operatively connected with the clutch, a pair of shifting rods, means connected therewith for shifting the shifting rods in either direction to neutral, a device on the shaft for setting into operation the last-mentioned means, and a control device for rendering said last-mentioned device inoperative.

6. In gear-shifting apparatus, the combination of a reciprocating shaft operatively connected with the clutch, a pair of shifting rods, means connected therewith for shifting the shifting rods to neutral, a device carried on the reciprocating shaft, and electrical magnetic means for throwing the said device out of operative contact so that the same cannot perform its normal function of setting in operation the means for shifting the shifting rods.

7. In gear-shifting apparatus, the combination of a reciprocating shaft, a pair of shifting rods each provided with a projecting lug, two pairs of arms operatively connected so as to move toward and from each other together and arranged to engage the two said lugs at any of the four extreme positions the same may occupy, and means on the reciprocating shaft for moving the arms.

8. In gear-shifting apparatus, the combination of a reciprocating shaft, a pair of shifting rods each provided with a projecting lug, two pairs of arms operatively connected so as to move toward and from each other together and arranged to engage the two said lugs at any of the four extreme positions the same may occupy, and an electric magnet carried on the reciprocating shaft together with an armature provided with a tail, the tail ordinarily arranged to set into operation the said arms but which can be made to clear the same by the armature being attracted to the magnet.

9. In gear-shifting apparatus, the combination of a reciprocating shaft, a pair of shifting rods, a projection on each shifting rod, and means carried on the reciprocating shaft which may be selectively caused to engage the projection on either shaft on the initial or return stroke of the reciprocating shaft at the option of the operator.

10. In gear-shifting apparatus, the combination of a transmission case, a pair of electrodes on each side of the inside of said case, one in advance of the other, a reciprocating member carrying a pair of electric magnets, a contact on each side of said reciprocating member connecting with each magnet and wiping the two electrodes on each side of the transmission case, a pair of shifting members each provided with a lug, and armature devices which can be dropped down in front of or behind each lug dependent upon whether the current energizes the magnet through the advanced or the further removed electrode.

In testimony whereof, I sign this specification in the presence of two witnesses.

NORMAN W. SAUNDERS.

Witnesses:
WARD H. PECK,
C. J. HUDDLESTON.